March 21, 1939. C. A. BERTEL 2,150,960
APPARATUS FOR HANDLING BALES AND THE LIKE
Filed Oct. 15, 1936 2 Sheets-Sheet 1

INVENTOR
C. A. Bertel
BY
Synnestvedt & Lechner
ATTORNEYS

March 21, 1939.  C. A. BERTEL  2,150,960
APPARATUS FOR HANDLING BALES AND THE LIKE
Filed Oct. 15, 1936  2 Sheets-Sheet 2
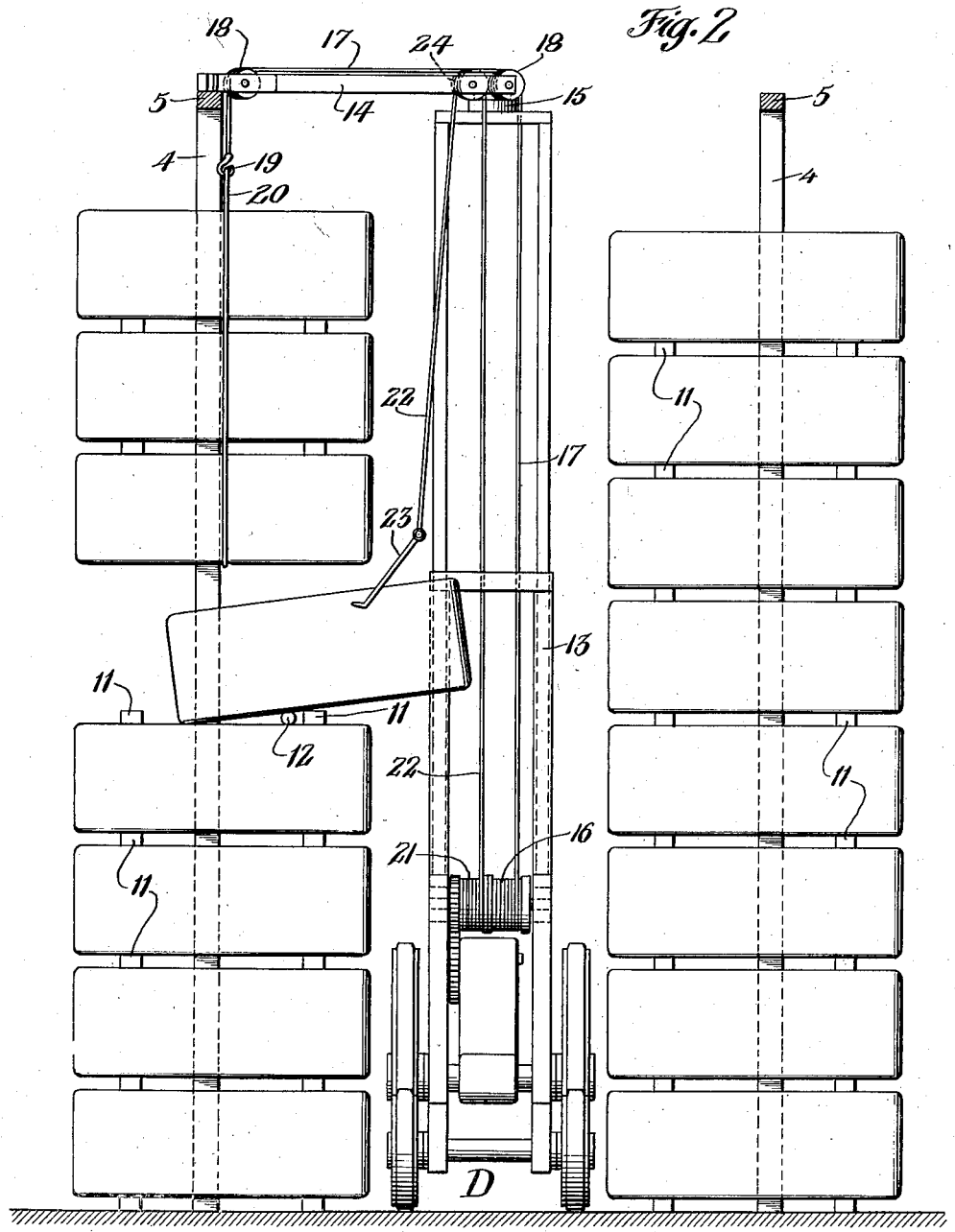
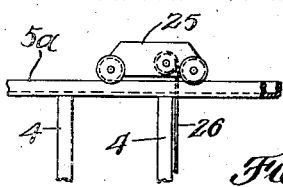
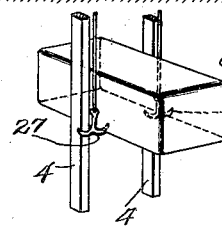
INVENTOR
C. A. Bertel
BY
Symestvedt + Lechne
ATTORNEYS Patented Mar. 21, 1939

2,150,960

UNITED STATES PATENT OFFICE 2,150,960

APPARATUS FOR HANDLING BALES AND THE LIKE

Charles Alvin Bertel, New Orleans, La.

Application October 15, 1936, Serial No. 105,742

5 Claims. (Cl. 214—8.5)

This invention relates to an improved apparatus for storing commodities such as bales of cotton, burlap, tobacco, drums, or the like in piles or stacks and in removing the same therefrom selectively.

The invention will be described in connection with the storing and handling of bales of cotton, but it will be apparent that the advantages of the invention may also be realized in handling and storing other articles and commodities such as mentioned above where selectivity is desired in removing them from storage.

By way of example, it is pointed out in removing bales of cotton from storage peculiar conditions of the cotton govern the selection of bales to be removed. Generally speaking, a warehouse receives cotton to be placed in storage from many firms regardless of grade. It is customary, however, for the firms to place tags on the bales so that bales of a particular grade can be readily identified. Owing to the great number of firms placing cotton in these warehouses and to the large number of different grades of cotton, it is not attempted to group the bales in any particular order.

It will be seen, therefore, that with the bales arranged in piles or stacks it becomes difficult to remove the bales selectively, i. e., to remove selected bales on top of which others are stored.

The primary object of my invention is the provision of a method and apparatus whereby the bales are stored and handled in a simple and effective manner to overcome difficulties such as mentioned above.

Another object of my invention is the provision of very simple apparatus for effectively handling the bales of such character that it can be readily and inexpensively applied to existing warehouses by reason of the fact that it is unnecessary to build special heavy superstructure into the warehouse to support the load of cumbersome operating machinery.

A further object resides in the provision of apparatus of the character described adapted to effectively relieve bales to be removed, of the weight of superimposed bales by central lift.

Still another object resides in the provision of apparatus of the character described in which load support in handling the bales is derived from a structure which is adapted to guide the bales in upright piles or stacks.

Another object resides in the provision of means separating the bales vertically to facilitate inserting a sling or other gripping device between the bales, and serving as an aid in pulling bales out of storage.

How the foregoing, together with such other objects and advantages as may hereinafter appear or are incident to my invention, are realized is illustrated in preferred form in the accompanying drawings, wherein—

Figure 2 is an elevational view of a modification of my invention;

Figure 3 is a fragmentary view of another modification of my invention; and

Figure 4 is a fragmentary perspective view illustrating another modification of the invention.

Figure 1:
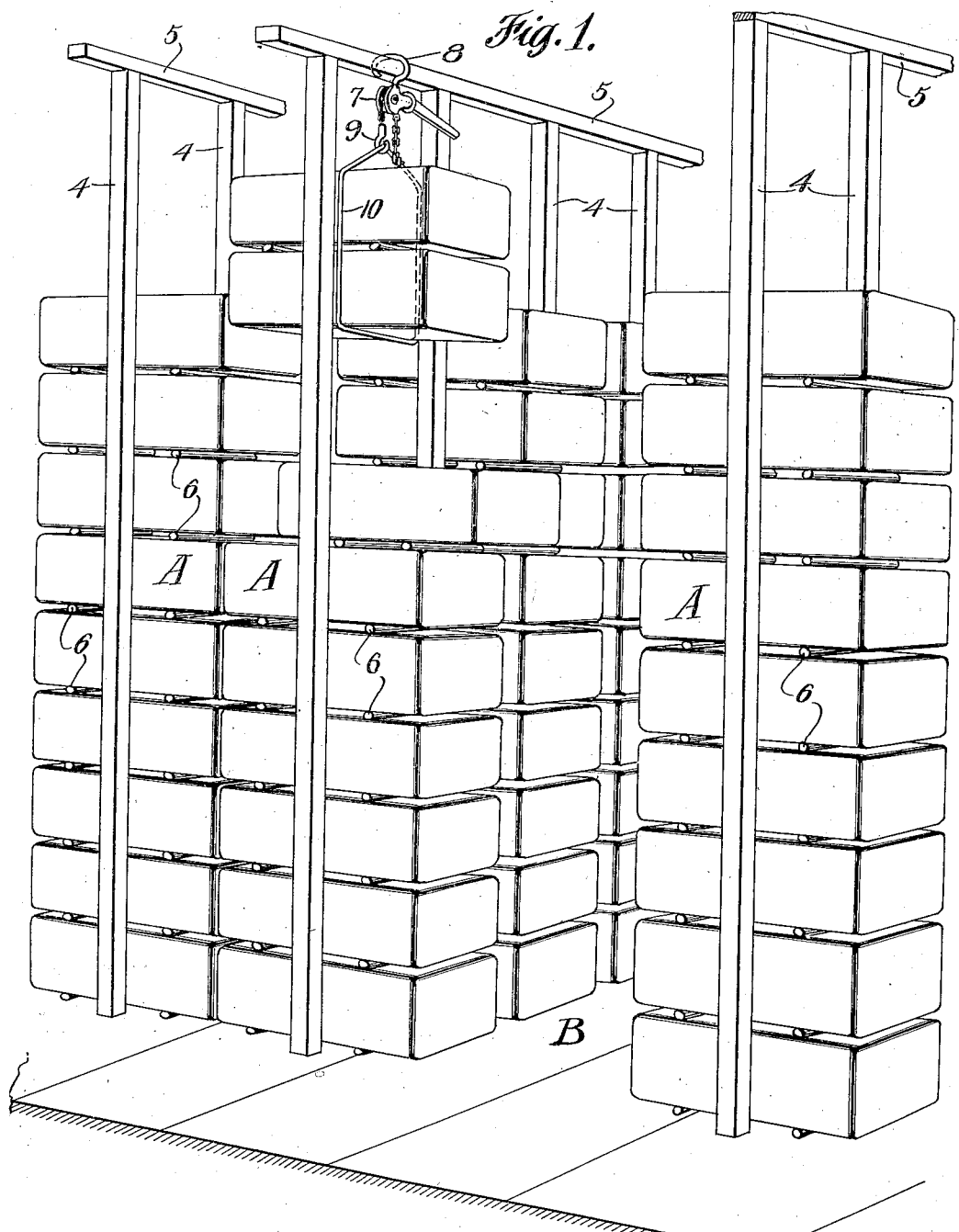
Figure 1 is a perspective view illustrating one embodiment of my invention.

In Figure 1 I have illustrated my invention as applied to a system of cotton bale storage in which the bales are stored in stacks or piles arranged in double rows A, A, i. e., the bales are stacked back to back in double rows with an aisle B between each double stack or row. The stacks are guided vertically by uprights 4 which as illustrated are located between each stack and preferably centrally of the sides thereof. These uprights are arranged in alignment and are connected at their upper ends to a longitudinally extending top member or cap plate 5, it being noted that the uprights and cap plate are of relatively light construction.

The bales are maintained in spaced superimposed relation by means of a plurality of members 6 extending crosswise thereof, which, as shown in Figure 1, are in the form of round rods.

In order to relieve a bale selected for removal of the weight of the superimposed bales, I provide a lifting device 7 of suitable form which is supported from the cap plate 5. In Figure 1 the lifting device 7 is in the form of a simple hand operated hoist which is hung from the cap plate as indicated at 8 and which is provided with a hook 9 for hooking it onto a sling or cable 10 encircling the bales to be lifted. The sling may be readily passed around the bales because of the spaces provided between superimposed bales by the members 6, and by passing the sling around the bales substantially centrally thereof I am enabled to lift the entire load of the superimposed bales from the bale to be removed in a very simple manner.

Since the hoist or lifting device 7 is supported from the cap plate 5 which rests on the uprights 4, the load support in lifting bales is derived from the cap plate and uprights and it will be seen, therefore, that the uprights, in addition to separating the piles, will, when bales are lifted, take the load and act as supporting columns.

After thus relieving the bale to be taken out of storage of the weight of the bales thereabove, the selected bale can readily be removed by pulling it out into the aisle, this being facilitated by means of the members 6 which due to their being round act as rollers. As illustrated in Figure 2, I also contemplate employing members 11 of rectangular cross-section for spacing the bales apart vertically to allow for passing the sling therebetween, and when these are employed a roller 12 may be inserted below the selected bale to facilitate its removal. After having removed the selected bale, the bales thereabove which have been lifted are lowered to rest in the stack by means of the lifting device. While I have shown a double stack arrangement in Figure 1, it is to be understood that my invention may be advantageously employed in storage systems in which the stacks are arranged in single rows, as illustrated in Figure 2, because since I apply the lift substantially centrally of the bales, the bales are lifted entirely clear of the selected bale, thus enabling the selected bale to be removed from either the front or rear aisle.

In Figure 2 I have illustrated lifting mechanism in the form of a portable tractor unit D having an upright telescoping frame 13 provided with a laterally extending arm 14 adapted to reach over the top of the stacks. This arm is preferably swiveled at 15 so that it can be swung over the stack from which a bale is to be removed, it being pointed out that the arm is positioned to rest on the cap plate 5. While the arm 14 is illustrated as only extending out from the frame 13 in one direction, I also contemplate having this arm extend out from the frame in both directions and providing a lifting cable at each end so that stacks on both sides of an aisle may be operated on in a very convenient manner.

The unit D is provided with a power device for operating a winding drum 16 for the cable 17 which passes over suitably arranged pulleys 18 and which is provided at its free end with a hook 19 for engaging the sling 20 encircling the bales to be lifted in the same manner as the sling 10 above described. Thus, when the cable 17 is wound onto the drum 16 the bales above the one selected for removal are lifted clear thereof. If desired, the selected bale may be removed by power, as illustrated in Figure 2, for example, by means of a power operated gripping device comprising a winding drum 21, a cable 22 having a gripper 23 at its free end and a suitable pulley 24.

It is to be noted that since the arm 14 of the unit D rests on the cap plate 5, the uprights 4 will take the load from the arm when bales are being lifted and thus act as supporting columns.

In the modification illustrated in Figure 3, I have provided a cap plate 5a in the form of a channel iron adapted to serve as a track for a small crane 25 which is provided with a lifting cable 26 for attachment to the bales to be lifted in the manner above described.

In Figure 4 I have shown a modification employing hooks 27 for lifting the bales. These hooks may be readily applied to the bales at the spaces therebetween and substantially centrally of each side in order to obtain central lift and may be associated with suitable lifting mechanism such as a hand crane, power crane, tractor device, or an air cylinder lift. I also contemplate obtaining central lift by means of a single scissors hook adapted to grip the bale at the side thereof.

I claim:

1. Apparatus for selectively removing bales, packages, or the like from piles of the same, comprising a plurality of spaced uprights constituting guides for said piles, means between superimposed articles spacing them vertically, said means being spaced apart longitudinally of the bales, and means for relieving an article selected for removal of the weight of superimposed articles, said means having a sling adapted to be passed through the space between a pair of superimposed bales and intermediate of the vertical spacing means so as to engage the bales to be lifted substantially centrally thereof.

2. In apparatus for storing and handling bales, packages, or the like to be stored in a plurality of stacks each composed of bales superimposed one above the other in vertical alignment, the combination of a plurality of spaced uprights constituting the sole guides for the stacks, a top member supported by and spacing the uprights at their top portions, and means supported by said top member for relieving a bale selected for removal of the weight of superimposed bales, said means having a sling adapted to be engaged with the bale above the selected one substantially centrally thereof.

3. In apparatus for storing and handling bales, packages, or the like, to be stored in a plurality of stacks each composed of bales superimposed one above the other in vertical alignment, the combination of a plurality of uprights arranged in a row and spaced apart an amount substantially equal to the width of a bale and constituting the sole guides for the bales, a top member extending longitudinally of said row and supported by said uprights at their upper portions, means located between superimposed bales for facilitating removal of the bales, and portable mechanism for relieving a bale selected for removal of the weight of superimposed bales, comprising means engaging said top member to derive load support from said member and said uprights when lifting bales.

4. In apparatus for storing and handling bales, packages, or the like, to be stored in a plurality of stacks each composed of bales superimposed one above the other in vertical alignment, the combination of a plurality of spaced uprights constituting the sole guides for the stacks, a top member supported by and spacing the uprights at their top portions, crane means supported by and running on said top member as a guide, said crane means having a lifting cable, and means for applying said cable to bales to be lifted clear of a bale selected for removal.

5. In apparatus for storing and handling bales, packages, or the like to be stored in a plurality of stacks each composed of bales superimposed one above the other in vertical alignment, the combination of a plurality of spaced uprights constituting the sole guides for the stacks, a top member supported by and spacing the uprights at their top portions, and means applicable to the bales and reacting from said top member to apply lift thereto substantially centrally thereof.

CHARLES ALVIN BERTEL.